(12) United States Patent
Chiu

(10) Patent No.: US 10,598,908 B2
(45) Date of Patent: Mar. 24, 2020

(54) WIDE-ANGLE LENS ASSEMBLY

(71) Applicants: Sintai Optical (Shenzhen) Co., Ltd., ShenZhen, Guandong Province (CN); Asia Optical Co., Inc., Taichung (TW)

(72) Inventor: Wei-Ting Chiu, Taichung (TW)

(73) Assignees: SINTAI OPTICAL (SHENZHEN) CO., LTD., Shenzhen, Guangdong Province (CN); ASIA OPTICAL CO., INC., Taichung (TW)

( * ) Notice: Subject to any disclaimer, the term of this patent is extended or adjusted under 35 U.S.C. 154(b) by 128 days.

(21) Appl. No.: 15/848,095

(22) Filed: Dec. 20, 2017

(65) Prior Publication Data
US 2018/0329183 A1 Nov. 15, 2018

(30) Foreign Application Priority Data
May 15, 2017 (TW) .............. 106115951 A

(51) Int. Cl.
*G02B 13/06* (2006.01)
*G02B 9/62* (2006.01)
*G02B 13/00* (2006.01)

(52) U.S. Cl.
CPC .............. *G02B 13/06* (2013.01); *G02B 9/62* (2013.01); *G02B 13/0045* (2013.01)

(58) Field of Classification Search
CPC ....... G02B 13/06; G02B 13/0045; G02B 9/62
USPC ........................................... 359/725
See application file for complete search history.

(56) References Cited

U.S. PATENT DOCUMENTS

2010/0142062 A1\* 6/2010 Asami ............. G02B 13/04
359/793

\* cited by examiner

*Primary Examiner* — Nicholas R. Pasko
*Assistant Examiner* — Mitchell T Oestreich
(74) *Attorney, Agent, or Firm* — McClure, Qualey & Rodack, LLP

(57) ABSTRACT

A wide-angle lens assembly comprises a first lens, a second lens, a third lens, a fourth lens, a fifth lens and a sixth lens sequentially from an object side to an image side along an optical axis. The first lens is a meniscus lens with negative refractive power. The second lens is with negative refractive power and includes a convex surface facing an object side. The third lens is with positive refractive power and includes a convex surface facing the object side. The fourth lens is with positive refractive power and includes a convex surface facing an image side. The fifth lens is with negative refractive power and includes a convex surface facing the image side. The sixth lens is with positive refractive power. The wide-angle lens assembly satisfies $Vd_4-Vd_5 \geq 50$, wherein $Vd_4$ is an Abbe number of the fourth lens and $Vd_5$ is an Abbe number of the fifth lens.

20 Claims, 14 Drawing Sheets

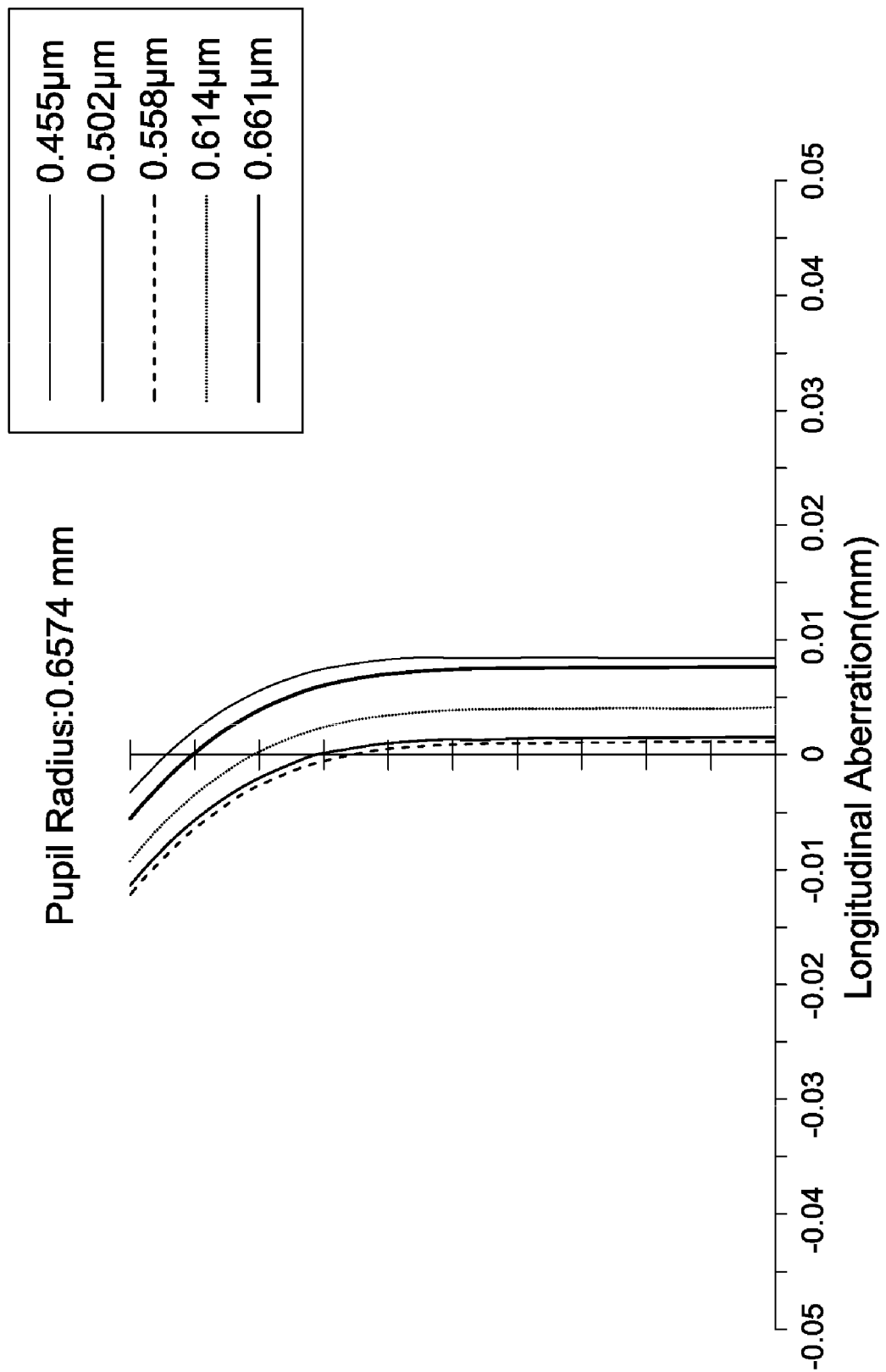

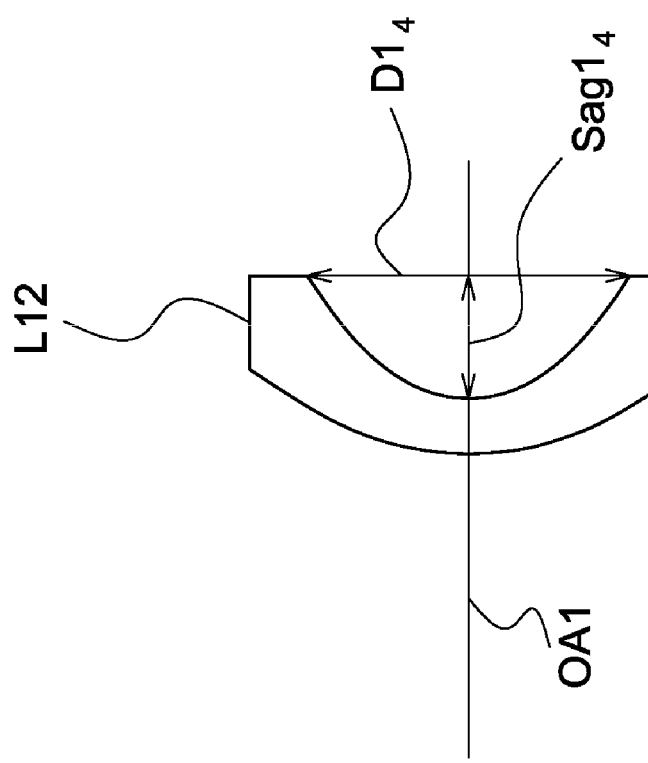

WIDE-ANGLE LENS ASSEMBLY

BACKGROUND OF THE INVENTION

Field of the Invention

The invention relates to a wide-angle lens assembly.

Description of the Related Art

Nowadays, the development trend of wide-angle lens, in addition to continuously toward miniaturization, wide field of view and have large aperture, also need to resist the change of environment temperature for different application requirements. However, the known wide-angle lens can't satisfy such requirements. Therefore, a wide-angle lens needs a new structure in order to meet the requirements of miniaturization, wide field of view, large aperture and resistance to environment temperature change at the same time.

BRIEF SUMMARY OF THE INVENTION

The invention provides a wide-angle lens assembly to solve the above problems. The wide-angle lens assembly of the invention is provided with characteristics of a shortened total lens length, a wider field of view, a decreased F-number and a resistance to severe environment temperature change and still has a good optical performance.

The wide-angle lens assembly in accordance with the invention comprises sequentially from an object side to an image side along an optical axis: a first lens which is a meniscus lens with negative refractive power, a second lens is with negative refractive power and includes a convex surface facing the object side, a third lens is with positive refractive power and includes a convex surface facing the object side, a fourth lens is with positive refractive power and includes a convex surface facing the image side, a fifth lens is with negative refractive power and includes a convex surface facing the image side, a sixth lens is with positive refractive power. The wide-angle lens assembly satisfies $Vd_4-Vd_5 \geq 50$, wherein $Vd_4$ is an Abbe number of the fourth lens and $Vd_5$ is an Abbe number of the fifth lens.

The first lens further comprises a convex surface facing the object side and a concave surface facing the image side, the second lens further comprises a concave surface facing the image side, the fifth lens further comprises a concave surface facing the object side and the sixth lens further comprises a convex surface facing the object side and a convex surface facing the image side.

The wide-angle lens assembly satisfies $Nd_3-Nd_1 \geq 0.35$, wherein $Nd_1$ is a refractive index of the first lens and $Nd_3$ is a refractive index of the third lens.

The wide-angle lens assembly satisfies $79 \geq Vd_4-Vd_5 \geq 50$, $0.59\ Nd_3-Nd_1 \geq 0.35$, wherein $Vd_4$ is an Abbe number of the fourth lens, $Vd_5$ is an Abbe number of the fifth lens, $Nd_1$ is a refractive index of the first lens and $Nd_3$ is a refractive index of the third lens.

The wide-angle lens assembly satisfies $Sag_2/D_2 \geq 0.24$, $Sag_4/D_4 \geq 0.29$, wherein $Sag_2$ is a distance vertically measuring from a plane formed by the edge of image side surface of the first lens to the vertex of the image side surface of the first lens, $D_2$ is an effective diameter of the image side surface of the first lens, $Sag_4$ is a distance vertically measuring from a plane formed by the edge of image side surface of the second lens to the vertex of the image side surface of the second lens and $D_4$ is an effective diameter of the image side surface of the second lens.

The wide-angle lens assembly satisfies $0.5 \geq Sag_2/D_2 \geq 0.24$, $1 \geq Sag_4/D_4 \geq 0.29$, wherein $Sag_2$ is a distance vertically measuring from a plane formed by the edge of image side surface of the first lens to the vertex of the image side surface of the first lens, $D_2$ is an effective diameter of the image side surface of the first lens, $Sag_4$ is a distance vertically measuring from a plane formed by the edge of image side surface of the second lens to the vertex of the image side surface of the second lens and $D_4$ is an effective diameter of the image side surface of the second lens.

The wide-angle lens assembly satisfies $0.2 \leq BFL/TTL \leq 0.5$, wherein BFL is an interval from the image side surface of the sixth lens to an image plane along the optical axis and TTL is an interval from an object side surface of the first lens to the image plane along the optical axis.

The wide-angle lens assembly satisfies $20°/mm < DFOV/f < 30°/mm$, wherein DFOV is a diagonal field of view in degree for the wide-angle lens assembly and f is an effective focal length in mm of the wide-angle lens assembly.

The fourth lens and the fifth lens are cemented together, the second lens and the sixth lens further comprises at least one aspheric surface.

The wide-angle lens assembly in accordance with the invention comprises sequentially from an object side to an image side along an optical axis: a first lens which is a meniscus lens with negative refractive power, a second lens is with negative refractive power and includes a convex surface facing the object side, a third lens is with positive refractive power and includes a convex surface facing the object side, a fourth lens is with positive refractive power and includes a convex surface facing the image side, a fifth lens is with negative refractive power and includes a convex surface facing the image side, a sixth lens is with positive refractive power. The wide-angle lens assembly satisfies $Sag_4/D_4 \geq 0.29$, wherein $Sag_4$ is a distance vertically measuring from a plane formed by the edge of image side surface of the second lens to the vertex of the image side surface of the second lens and $D_4$ is an effective diameter of the image side surface of the second lens.

The wide-angle lens assembly satisfies $0.5 \geq Sag_2/D_2 \geq 0.24$, $1 \geq Sag_4/D_4 \geq 0.29$, wherein $Sag_2$ is a distance vertically measuring from a plane formed by the edge of image side surface of the first lens to the vertex of the image side surface of the first lens, $D_2$ is an effective diameter of the image side surface of the first lens, $Sag_4$ is a distance vertically measuring from a plane formed by the edge of image side surface of the second lens to the vertex of the image side surface of the second lens and $D_4$ is an effective diameter of the image side surface of the second lens.

The wide-angle lens assembly satisfies $79 \geq Vd_4-Vd_5 \geq 50$, $0.59 \geq Nd_3-Nd_1 \geq 0.35$, wherein $Vd_4$ is an Abbe number of the fourth lens, $Vd_5$ is an Abbe number of the fifth lens, $Nd_1$ is a refractive index of the first lens and $Nd_3$ is a refractive index of the third lens.

The wide-angle lens assembly satisfies $0.2 \leq BFL/TTL \leq 0.5$, wherein BFL is an interval from the image side surface of the sixth lens to an image plane along the optical axis and TTL is an interval from an object side surface of the first lens to the image plane along the optical axis.

The wide-angle lens assembly satisfies $20°/mm < DFOV/f < 30°/mm$, wherein DFOV is a diagonal field of view in degree for the wide-angle lens assembly and f is an effective focal length in mm of the wide-angle lens assembly.

The fourth lens and the fifth lens are cemented together, the second lens and the sixth lens further comprises at least one aspheric surface.

The wide-angle lens assembly in accordance with the invention comprises sequentially from an object side to an image side along an optical axis: a first lens which is a meniscus lens with negative refractive power, a second lens is with negative refractive power and includes a convex surface facing the object side, a third lens is with positive refractive power and includes a convex surface facing the object side, a fourth lens is with positive refractive power and includes a convex surface facing the image side, a fifth lens is with negative refractive power and includes a convex surface facing the image side, a sixth lens is with positive refractive power. The wide-angle lens assembly satisfies 0.279≤BFL/TTL≤0.5, wherein BFL is an interval from the image side surface of the sixth lens to an image plane along the optical axis and TTL is an interval from an object side surface of the first lens to the image plane along the optical axis.

The wide-angle lens assembly satisfies $Sag_2/D_2 \geq 0.24$, $Sag_4/D_4 \geq 0.29$, wherein $Sag_2$ is a distance vertically measuring from a plane formed by the edge of image side surface of the first lens to the vertex of the image side surface of the first lens, $D_2$ is an effective diameter of the image side surface of the first lens, $Sag_4$ is a distance vertically measuring from a plane formed by the edge of image side surface of the second lens to the vertex of the image side surface of the second lens and $D_4$ is an effective diameter of the image side surface of the second lens.

The wide-angle lens assembly satisfies $Vd_4-Vd_5 \geq 50$, $Nd_3-Nd_1 \geq 0.35$, wherein $Vd_4$ is an Abbe number of the fourth lens, $Vd_5$ is an Abbe number of the fifth lens, $Nd_1$ is a refractive index of the first lens and $Nd_3$ is a refractive index of the third lens.

The wide-angle lens assembly satisfies 20°/mm<DFOV/f<30°/mm, wherein DFOV is a diagonal field of view in degree for the wide-angle lens assembly and f is an effective focal length in mm of the wide-angle lens assembly.

The fourth lens and the fifth lens are cemented together, the second lens and the sixth lens further comprises at least one aspheric surface.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 2A depicts a longitudinal aberration diagram of the wide-angle lens assembly in accordance with the first embodiment of the invention;

FIG. 2E is a schematic diagram of $Sag1_4$ and $D1_4$ of the second lens in accordance with a first embodiment of the invention;

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
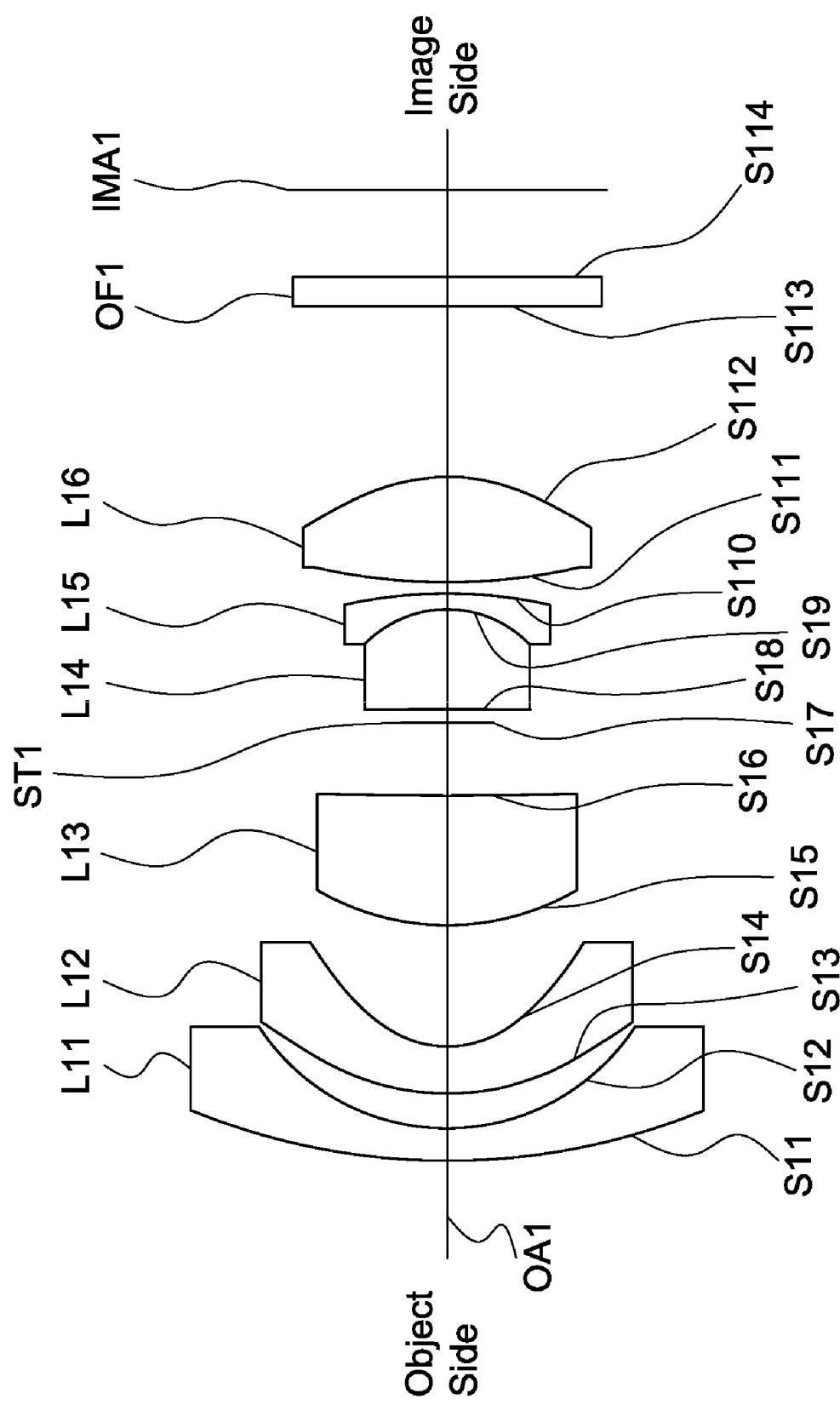
FIG. 1 is a lens layout diagram of a wide-angle lens assembly in accordance with a first embodiment of the invention.

Referring to FIG. 1, FIG. 1 is a lens layout diagram of a wide-angle lens assembly in accordance with a first embodiment of the invention. The wide-angle lens assembly 1 includes a first lens L11, a second lens L12, a third lens L13, a stop ST1, a fourth lens L14, a fifth lens L15, a sixth lens L16 and an optical filter OF1, all of which are arranged in order from an object side to an image side along an optical axis OA1. In operation, an image of light rays from the object side is formed at the image plane IMA1.

The first lens L11 is a meniscus lens with negative refractive power and made of glass material, wherein the object side surface S11 is a convex surface, the image side surface S12 is a concave surface and both of the object side surface S11 and image side surface S12 are spherical surfaces. The second lens L12 is a meniscus lens with negative refractive power and made of glass material, wherein the object side surface S13 is a convex surface, the image side surface S14 is a concave surface and both of the object side surface S13 and image side surface S14 are aspheric surfaces. The third lens L13 is a meniscus lens with positive refractive power and made of glass material, wherein the object side surface S15 is a convex surface, the image side surface S16 is a concave surface and both of the object side surface S15 and image side surface S16 are spherical surfaces. The fourth lens L14 is a meniscus lens with positive refractive power and made of glass material, wherein the object side surface S18 is a concave surface, the image side surface S19 is a convex surface and both of the object side surface S18 and image side surface S19 are spherical surfaces. The fifth lens L15 is a meniscus lens with negative refractive power and made of glass material, wherein the object side surface S19 is a concave surface, the image side surface S110 is a convex surface and both of the object side surface S19 and image side surface S110 are spherical surfaces. The fourth lens L14 and the fifth lens L15 are cemented together. The sixth lens L16 is a biconvex lens with positive refractive power and made of glass material, wherein the object side surface S111 is a convex surface, the image side surface S112 is a convex surface and both of the object side surface S111 and image side surface S112 are aspheric surfaces. Both of the object side surface S113 and image side surface S114 of the optical filter OF1 are plane surfaces.

Figure 2B:
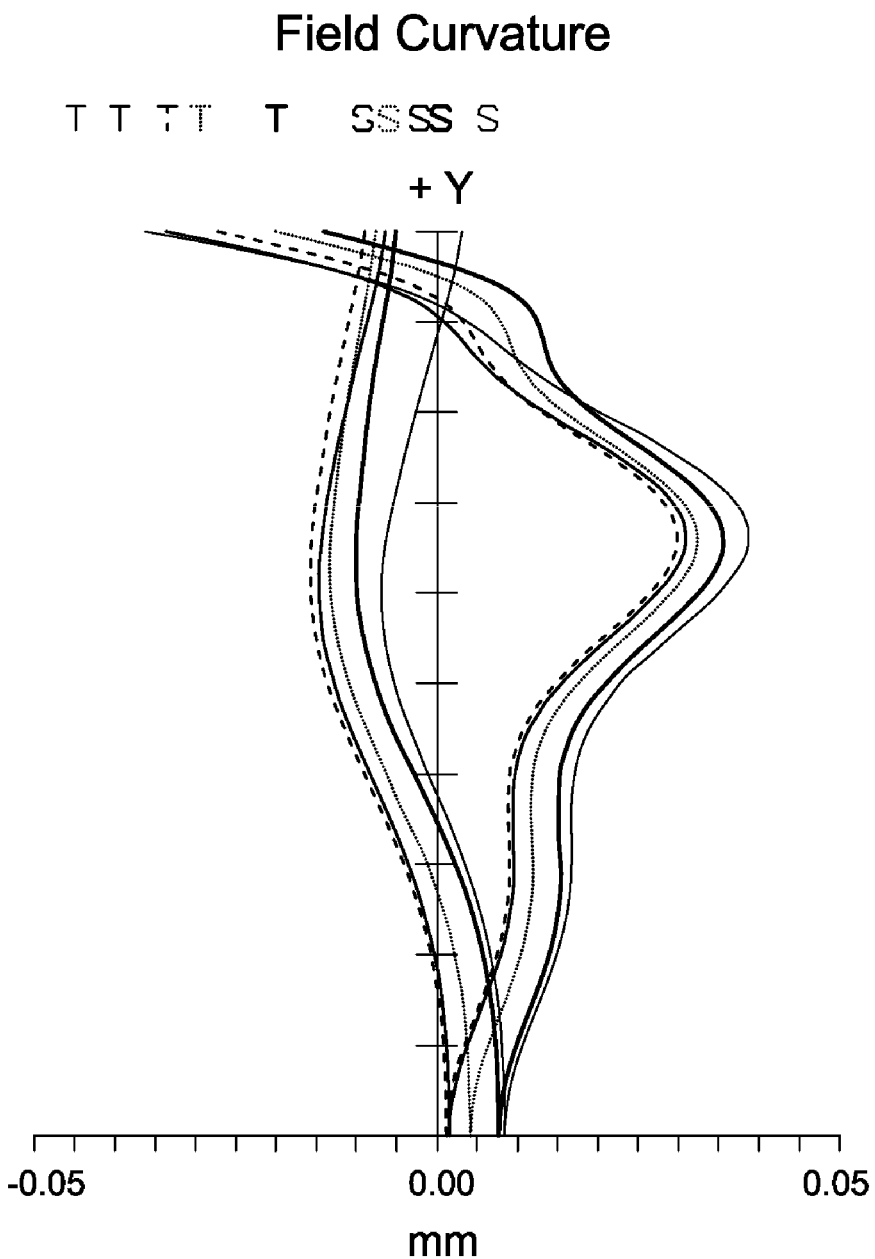
FIG. 2B is a field curvature diagram of the wide-angle lens assembly in accordance with the first embodiment of the invention.
Figure 2C:
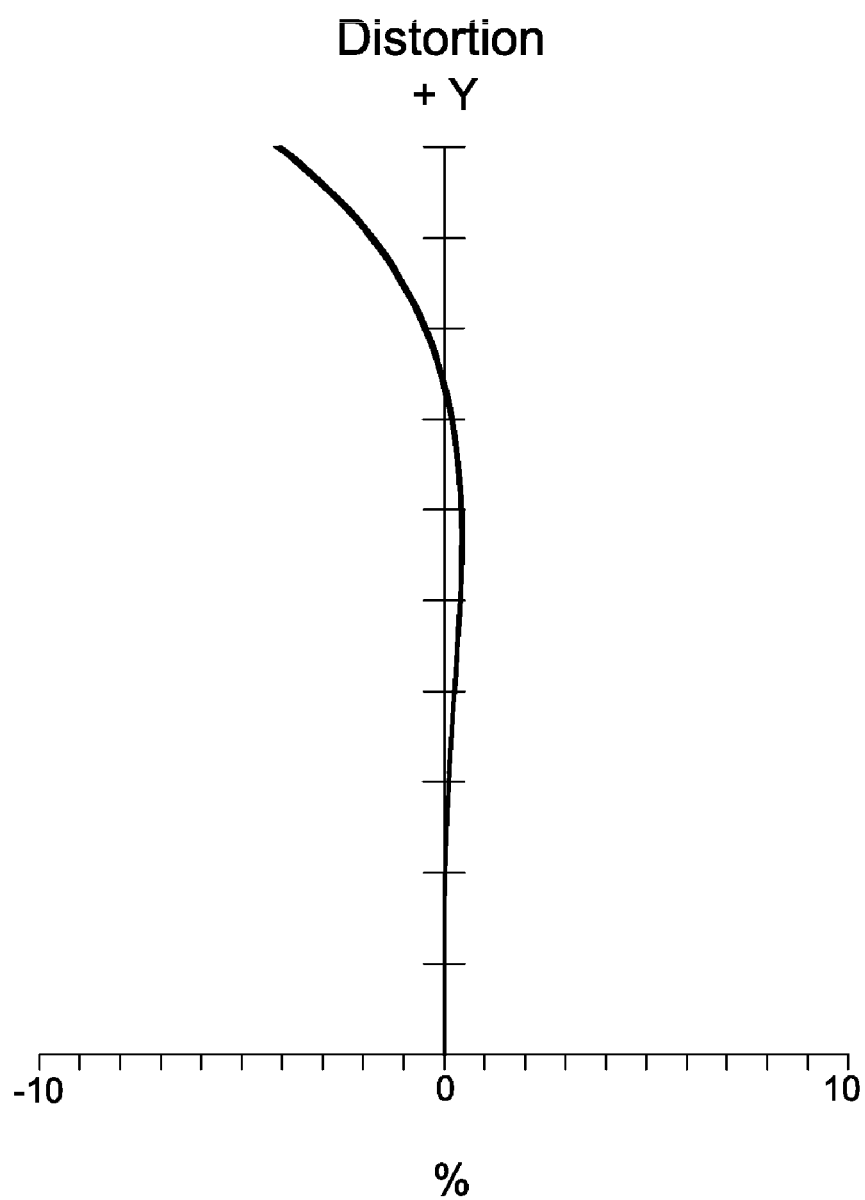
FIG. 2C is a distortion diagram of the wide-angle lens assembly in accordance with the first embodiment of the invention.
Figure 2D:
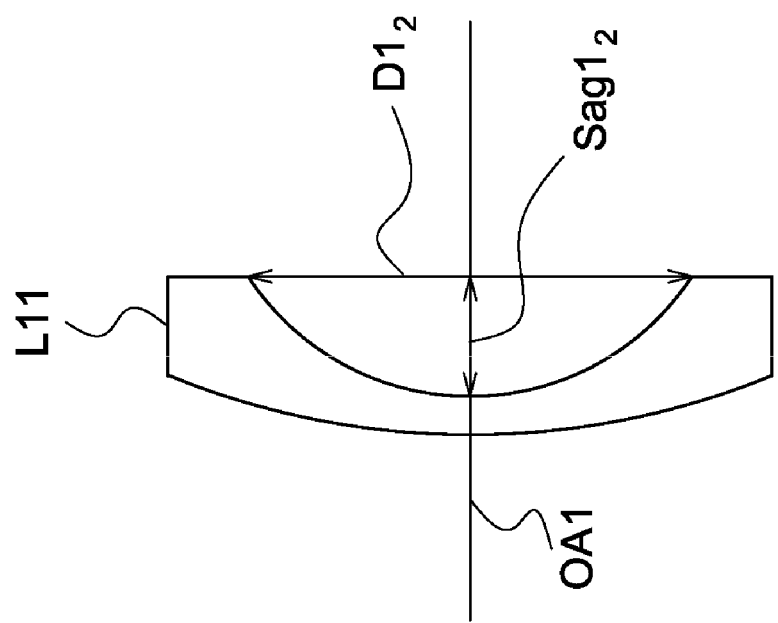
FIG. 2D is a schematic diagram of $Sag1_2$ and $D1_2$ of the first lens in accordance with a first embodiment of the invention.

In addition, the wide-angle lens assembly 1 of the first embodiment at least satisfies one of the following conditions:

$$Sag1_2/D1_2 \geq 0.24 \quad (1)$$

$$Sag1_4/D1_4 \geq 0.29 \quad (2)$$

$$0.2 \leq BFL1/TTL1 \leq 0.5 \quad (3)$$

$$Vd1_4 - Vd1_5 \geq 50 \quad (4)$$

$$Nd1_3 - Nd1_1 \geq 0.35 \quad (5)$$

$$20°/mm < DFOV1/f1 < 30°/mm \quad (6)$$

wherein $Sag1_2$ is a distance vertically measuring from a plane formed by the edge of image side surface S12 of the first lens L11 to the vertex of the image side surface S12 of the first lens L11, $D1_2$ is an effective diameter of the image side surface S12 of the first lens L11, the schematic diagram of $Sag1_2$ and $D1_2$ by referring to FIG. 2D, $Sag1_4$ is a distance vertically measuring from a plane formed by the edge of image side surface S14 of the second lens L12 to the vertex of the image side surface S14 of the second lens L12, $D_4$ is an effective diameter of the image side surface S14 of the second lens L12, the schematic diagram of $Sag1_4$ and $D1_4$ by referring to FIG. 2E, BFL1 is an interval from the image side surface S112 of the sixth lens L16 to an image plane IMA1 along the optical axis OA1, TTL1 is an interval from an object side surface S11 of the first lens L11 to the image plane IMA1 along the optical axis OA1, $Vd1_4$ is an Abbe number of the fourth lens L14, $Vd1_5$ is an Abbe number of the fifth lens L15, $Nd1_1$ is a refractive index of the first lens L11, $Nd1_3$ is a refractive index of the third lens L13, DFOV1 is a diagonal field of view for the wide-angle lens assembly 1 and f1 is an effective focal length of the wide-angle lens assembly 1.

By the above design of the lenses and stop ST1, the wide-angle lens assembly 1 is provided with a shortened total lens length, a decreased F-number, an effective corrected aberration and a resistance to severe environment temperature change on image quality.

length is equal to 23.860 mm and diagonal field of view is equal to 97.44° for the wide-angle lens assembly 1 of the first embodiment of the invention.

TABLE 1

Effective Focal Length = 3.697 mm F-number = 2.8
Total Lens Length = 23.860 mm Diagonal Field of View = 97.44°

| Surface Number | Radius of Curvature (mm) | Thickness (mm) | Nd | Vd | Remark |
|---|---|---|---|---|---|
| S11 | 16.855 | 0.797 | 1.52 | 64.2 | The First Lens L11 |
| S12 | 5.498 | 0.866 | | | |
| S13 | 6.788 | 1.151 | 1.74 | 49.3 | The Second Lens L12 |
| S14 | 2.598 | 2.974 | | | |
| S15 | 6.261 | 3.183 | 1.9 | 31.3 | The Third Lens L13 |
| S16 | 62.604 | 1.786 | | | |
| S17 | ∞ | 0.347 | | | Stop ST1 |
| S18 | −42.068 | 2.450 | 1.5 | 81.6 | The Fourth Lens L14 |
| S19 | −2.794 | 0.398 | 1.81 | 25.5 | The Fifth Lens L15 |
| S110 | −11.055 | 0.263 | | | |
| S111 | 12.846 | 2.590 | 1.68 | 54.9 | The Sixth Lens L16 |
| S112 | −4.585 | 4.195 | | | |
| S113 | ∞ | 0.720 | 1.52 | 64.2 | Optical Filter OF1 |
| S114 | ∞ | 2.130 | | | |

The aspheric surface sag z of each lens in Table 1 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the first embodiment, the conic constant k and the aspheric coefficients A, B, C, D, E, F, G of each surface are shown in Table 2.

TABLE 2

| Surface Number | k | A | B | C | D | E | F | G |
|---|---|---|---|---|---|---|---|---|
| S13 | −0.456 | 2.52E−03 | −2.78E−04 | 2.05E−05 | −1.24E−06 | 4.97E−08 | −1.06E−09 | 8.20E−12 |
| S14 | −0.572 | 3.67E−03 | −7.83E−04 | 1.18E−04 | −2.21E−05 | 2.29E−06 | −1.21E−07 | 2.38E−09 |
| S111 | 0.251 | −1.22E−03 | 9.56E−05 | 2.44E−05 | −1.01E−05 | 1.45E−06 | −9.40E−08 | 2.29E−09 |
| S112 | −0.708 | 7.24E−04 | 1.03E−04 | −3.55E−05 | 8.47E−06 | −1.09E−06 | 7.10E−08 | −1.80E−09 |

If the value of $Vd1_4-Vd1_5$ of condition (4) is less than 50, and it will bring poor effect of the chromatic aberration correction. Therefore, the value of $Vd1_4-Vd1_5$ needs to at least greater than 50, an optimal range is $79 \geq Vd1_4-Vd1_5 \geq 50$ for the optimal benefit of chromatic aberration correction.

In order to achieve the above purposes and effectively enhance the optical performance, the wide-angle lens assembly 1 in accordance with the first embodiment of the invention is provided with the optical specifications shown in Table 1, which include the effective focal length, F-number, total lens length, diagonal field of view, radius of curvature of each lens surface, thickness between adjacent surface, refractive index of each lens and Abbe number of each lens. Table 1 shows that the effective focal length is equal to 3.697 mm, F-number is equal to 2.8, total lens Table 3 shows the parameter value and the calculated value of the above conditions (1)-(6). For the wide-angle lens assembly 1 of the first embodiment which respectively satisfy the above conditions (1)-(6) as can be seen from table 3.

TABLE 3

| $Sag1_2$ | 2.666 mm | $D1_2$ | 9.441 mm | $Sag1_4$ | 2.607 mm |
|---|---|---|---|---|---|
| $D1_4$ | 6.556 mm | BFL1 | 7.045 mm | TTL1 | 23.860 mm |
| $Vd1_4$ | 81.6 | $Vd1_5$ | 25.5 | $Nd1_1$ | 1.52 |
| $Nd1_3$ | 1.9 | DFOV1 | 97.44° | f1 | 3.697 mm |
| $Sag1_2/D1_2$ | 0.282 | $Sag1_4/D1_4$ | 0.398 | BFL1/TTL1 | 0.295 |

TABLE 3-continued

| | | | | | |
|---|---|---|---|---|---|
| $Vd1_4 - Vd1_5$ | 56.1 | $Nd1_3 - Nd1_1$ | 0.38 | DFOV1/f1 | 26.357°/mm |

By the above arrangements of the lenses and stop ST1, the wide-angle lens assembly 1 of the first embodiment can meet the requirements of optical performance as seen in FIGS. 2A-2C, wherein FIG. 2A shows a longitudinal aberration diagram of the wide-angle lens assembly 1 in accordance with the first embodiment of the invention, FIG. 2B shows a field curvature diagram of the wide-angle lens assembly 1 in accordance with the first embodiment of the invention and FIG. 2C shows a distortion diagram of the wide-angle lens assembly 1 in accordance with the first embodiment of the invention.

It can be seen from FIG. 2A that the longitudinal aberration in the wide-angle lens assembly 1 of the first embodiment ranges from −0.015 mm to 0.01 mm for the wavelength of 0.455 μm, 0.502 μm, 0.558 μm, 0.614 μm and 0.661 μm. It can be seen from FIG. 2B that the field curvature of tangential direction and sagittal direction in the wide-angle lens assembly 1 of the first embodiment ranges from −0.04 mm to 0.04 mm for the wavelength of 0.455 μm, 0.502 μm, 0.558 μm, 0.614 μm and 0.661 μm. It can be seen from FIG. 2C (in which the five lines in the figure almost coincide to appear as if a signal line) that the distortion in the wide-angle lens assembly 1 of the first embodiment ranges from −4.5% to 0.5% for the wavelength of 0.455 μm, 0.502 μm, 0.558 μm, 0.614 μm and 0.661 μm. It is obvious that the longitudinal aberration, the field curvature and the distortion of the wide-angle lens assembly 1 of the first embodiment can be corrected effectively. Therefore, the wide-angle lens assembly 1 of the first embodiment is capable of good optical performance.

Figure 3:
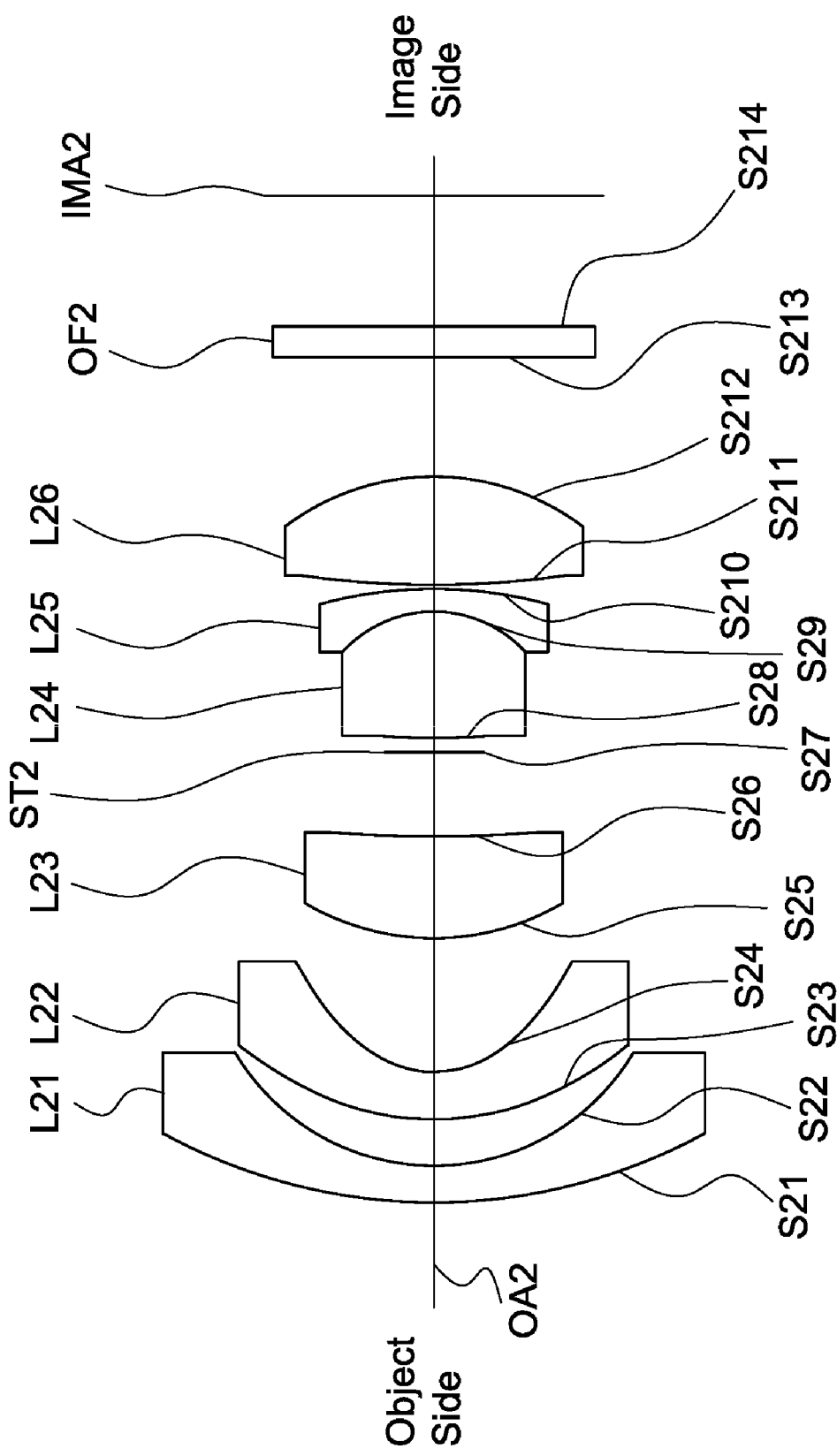
FIG. 3 is a lens layout diagram of a wide-angle lens assembly in accordance with a second embodiment of the invention.

Referring to FIG. 3, FIG. 3 is a lens layout diagram of a wide-angle lens assembly in accordance with a second embodiment of the invention. The wide-angle lens assembly 2 includes a first lens L21, a second lens L22, a third lens L23, a stop ST2, a fourth lens L24, a fifth lens L25, a sixth lens L26 and an optical filter OF2, all of which are arranged in order from an object side to an image side along an optical axis OA2. In operation, an image of light rays from the object side is formed at the image plane IMA2.

The first lens L21 is a meniscus lens with negative refractive power and made of glass material, wherein the object side surface S21 is a convex surface, the image side surface S22 is a concave surface and both of the object side surface S21 and image side surface S22 are spherical surfaces. The second lens L22 is a meniscus lens with negative refractive power and made of glass material, wherein the object side surface S23 is a convex surface, the image side surface S24 is a concave surface and both of the object side surface S23 and image side surface S24 are aspheric surfaces. The third lens L23 is a meniscus lens with positive refractive power and made of glass material, wherein the object side surface S25 is a convex surface, the image side surface S26 is a concave surface and both of the object side surface S25 and image side surface S26 are spherical surfaces. The fourth lens L24 is a biconvex lens with positive refractive power and made of glass material, wherein the object side surface S28 is a convex surface, the image side surface S29 is a convex surface and both of the object side surface S28 and image side surface S29 are spherical surfaces. The fifth lens L25 is a meniscus lens with negative refractive power and made of glass material, wherein the object side surface S29 is a concave surface, the image side surface S210 is a convex surface and both of the object side surface S29 and image side surface S210 are spherical surfaces. The fourth lens L24 and the fifth lens L25 are cemented together. The sixth lens L26 is a biconvex lens with positive refractive power and made of glass material, wherein the object side surface S211 is a convex surface, the image side surface S212 is a convex surface and both of the object side surface S211 and image side surface S212 are aspheric surfaces. Both of the object side surface S213 and image side surface S214 of the optical filter OF2 are plane surfaces.

In addition, the wide-angle lens assembly 2 of the second embodiment at least satisfies one of the following conditions:

$$Sag2_2/D2_2 \geq 0.24 \tag{7}$$

$$Sag2_4/D2_4 \geq 0.29 \tag{8}$$

$$0.2 \leq BFL2/TTL2 \leq 0.5 \tag{9}$$

$$Vd2_4 - Vd2_5 \geq 50 \tag{10}$$

$$Nd2_3 - Nd2_1 \geq 0.35 \tag{11}$$

$$20°/mm < DFOV2/f2 < 30°/mm \tag{12}$$

The definition of $Sag2_2$, $D2_2$, $Sag2_4$, $D2_4$, BFL2, TTL2, $Vd2_4$, $Vd2_5$, $Nd2_1$, $Nd2_3$, DFOV2 and f2 are the same as that of $Sag1_2$, $D1_2$, $Sag1_4$, $D1_4$, BFL1, TTL1, $Vd1_4$, $Vd1_5$, $Nd1_1$, $Nd1_3$, DFOV1 and f1 in the first embodiment, and is not described here again.

By the above design of the lenses and stop ST2, the wide-angle lens assembly 2 is provided with a shortened total lens length, a decreased F-number, an effective corrected aberration and a resistance to severe environment temperature change on image quality.

If the value of $Nd2_3 - Nd2_1$ of condition (11) is less than 0.35, and it will become difficult to shorten the total lens length of wide-angle lens assembly 2. Therefore, the value of $Nd2_3 - Nd2_1$ needs to at least greater than or equal to 0.35, an optimal range is $0.59 \geq Nd2_3 - Nd2_1 \geq 0.35$ for the benefit of shortening the total lens length.

In order to achieve the above purposes and effectively enhance the optical performance, the wide-angle lens assembly 2 in accordance with the second embodiment of the invention is provided with the optical specifications shown in Table 4, which include the effective focal length, F-number, total lens length, diagonal field of view, radius of curvature of each lens surface, thickness between adjacent surface, refractive index of each lens and Abbe number of each lens. Table 4 shows that the effective focal length is equal to 3.683 mm, F-number is equal to 2.8, total lens length is equal to 23.850 mm and diagonal field of view is equal to 97.63° for the wide-angle lens assembly 2 of the second embodiment of the invention.

TABLE 4

Effective Focal Length = 3.683 mm F-number = 2.8
Total Lens Length = 23.850 mm Diagonal Field of View = 97.63°

| Surface Number | Radius of Curvature (mm) | Thickness (mm) | Nd | Vd | Remark |
|---|---|---|---|---|---|
| S21 | 13.577 | 0.862 | 1.52 | 64.2 | The First Lens L21 |
| S22 | 5.498 | 1.102 | | | |
| S23 | 7.177 | 1.122 | 1.74 | 49.3 | The Second Lens L22 |
| S24 | 2.545 | 3.170 | | | |

TABLE 4-continued

Effective Focal Length = 3.683 mm F-number = 2.8
Total Lens Length = 23.850 mm Diagonal Field of View = 97.63°

| Surface Number | Radius of Curvature (mm) | Thickness (mm) | Nd | Vd | Remark |
|---|---|---|---|---|---|
| S25 | 6.003 | 2.414 | 1.9 | 31.3 | The Third Lens L23 |
| S26 | 31.931 | 2.000 | | | |
| S27 | ∞ | 0.347 | | | Stop ST2 |
| S28 | 24.006 | 2.992 | 1.5 | 81.6 | The Fourth Lens L24 |
| S29 | −2.936 | 0.531 | 1.81 | 25.5 | The Fifth Lens L25 |
| S210 | −10.412 | 0.099 | | | |
| S211 | 17.398 | 2.566 | 1.68 | 54.9 | The Sixth Lens L26 |
| S212 | −5.060 | 2.840 | | | |
| S213 | ∞ | 0.720 | 1.52 | 64.2 | Optical Filter OF2 |
| S214 | ∞ | 3.095 | | | |

The aspheric surface sag z of each lens in Table 4 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the second embodiment, the conic constant k and the aspheric coefficients A, B, C, D, E, F, G of each surface are shown in Table 5.

TABLE 5

| Surface Number | k | A | B | C | D | E | F | G |
|---|---|---|---|---|---|---|---|---|
| S23 | −0.990 | 2.51E−03 | −2.64E−04 | 2.11E−05 | −1.31E−06 | 5.53E−08 | −1.28E−09 | 1.14E−11 |
| S24 | −0.595 | 4.13E−03 | −8.03E−04 | 1.37E−04 | −2.44E−05 | 2.45E−06 | −1.21E−07 | 2.01E−09 |
| S211 | −5.459 | −1.08E−03 | 1.07E−04 | 1.97E−05 | −1.00E−05 | 1.49E−06 | −9.14E−08 | 1.72E−09 |
| S212 | −0.646 | 3.46E−04 | 1.84E−04 | −5.44E−05 | 1.07E−05 | −1.28E−06 | 8.33E−08 | −2.23E−09 |

Table 6 shows the parameter value and the calculated value of the above conditions (7)-(12). For the wide-angle lens assembly 2 of the second embodiment which respectively satisfy the above conditions (7)-(12) as can be seen from table 6.

TABLE 6

| | | | | | |
|---|---|---|---|---|---|
| $Sag2_2$ | 2.563 mm | $D2_2$ | 9.310 mm | $Sag2_4$ | 2.604 mm |
| $D2_4$ | 6.785 mm | BFL2 | 6.655 mm | TTL2 | 23.850 mm |
| $Vd2_4$ | 81.6 | $Vd2_5$ | 25.5 | $Nd2_1$ | 1.52 |
| $Nd2_3$ | 1.9 | DFOV2 | 97.63° | f2 | 3.683 mm |
| $Sag2_2/D2_2$ | 0.275 | $Sag2_4/D2_4$ | 0.384 | BFL2/TTL2 | 0.279 |
| $Vd2_4 - Vd2_5$ | 56.1 | $Nd2_3 - Nd2_1$ | 0.38 | DFOV2/f2 | 26.508°/mm |

Figure 4A:
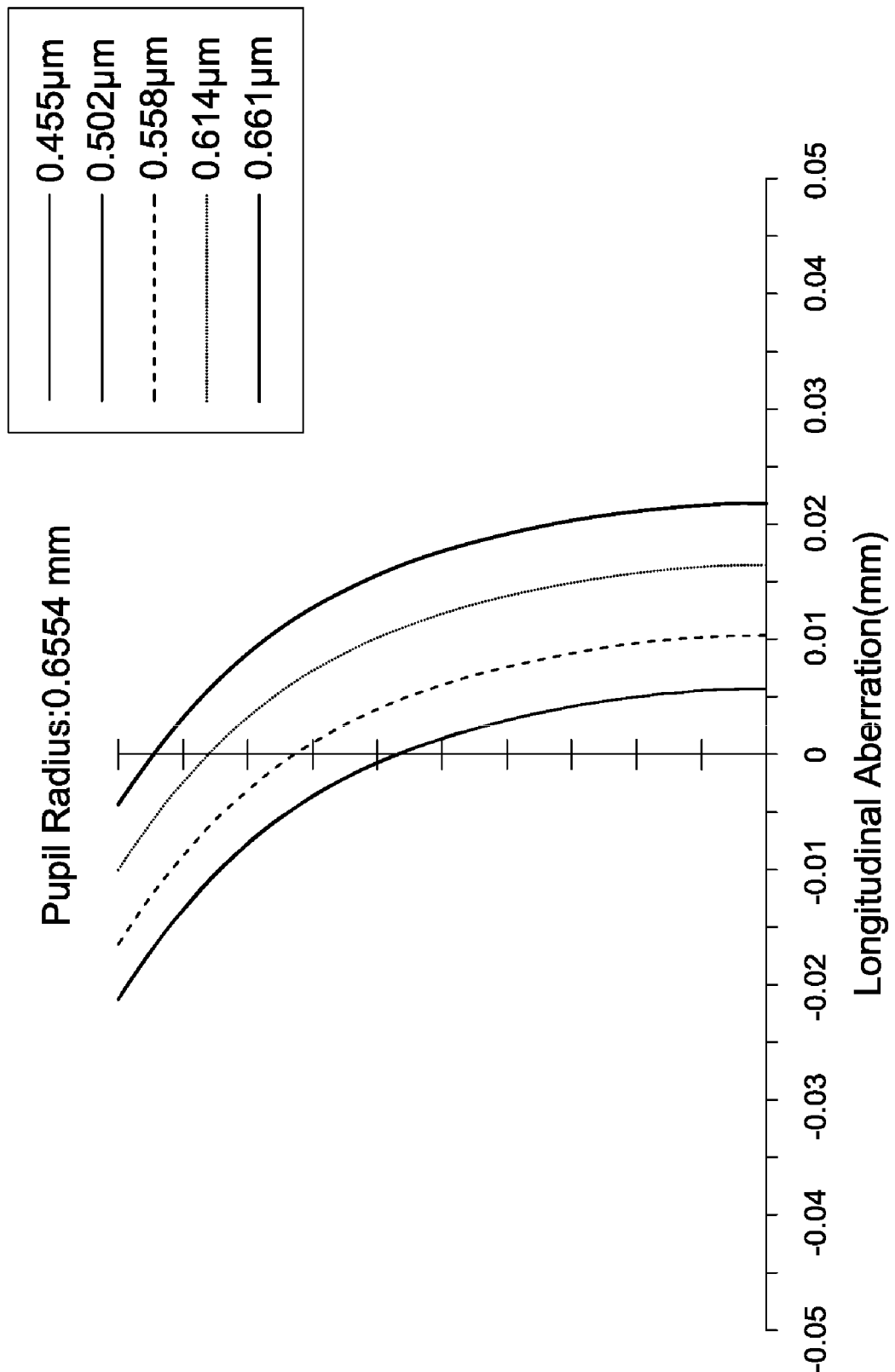
FIG. 4A depicts a longitudinal aberration diagram of the wide-angle lens assembly in accordance with the second embodiment of the invention.
Figure 4B:
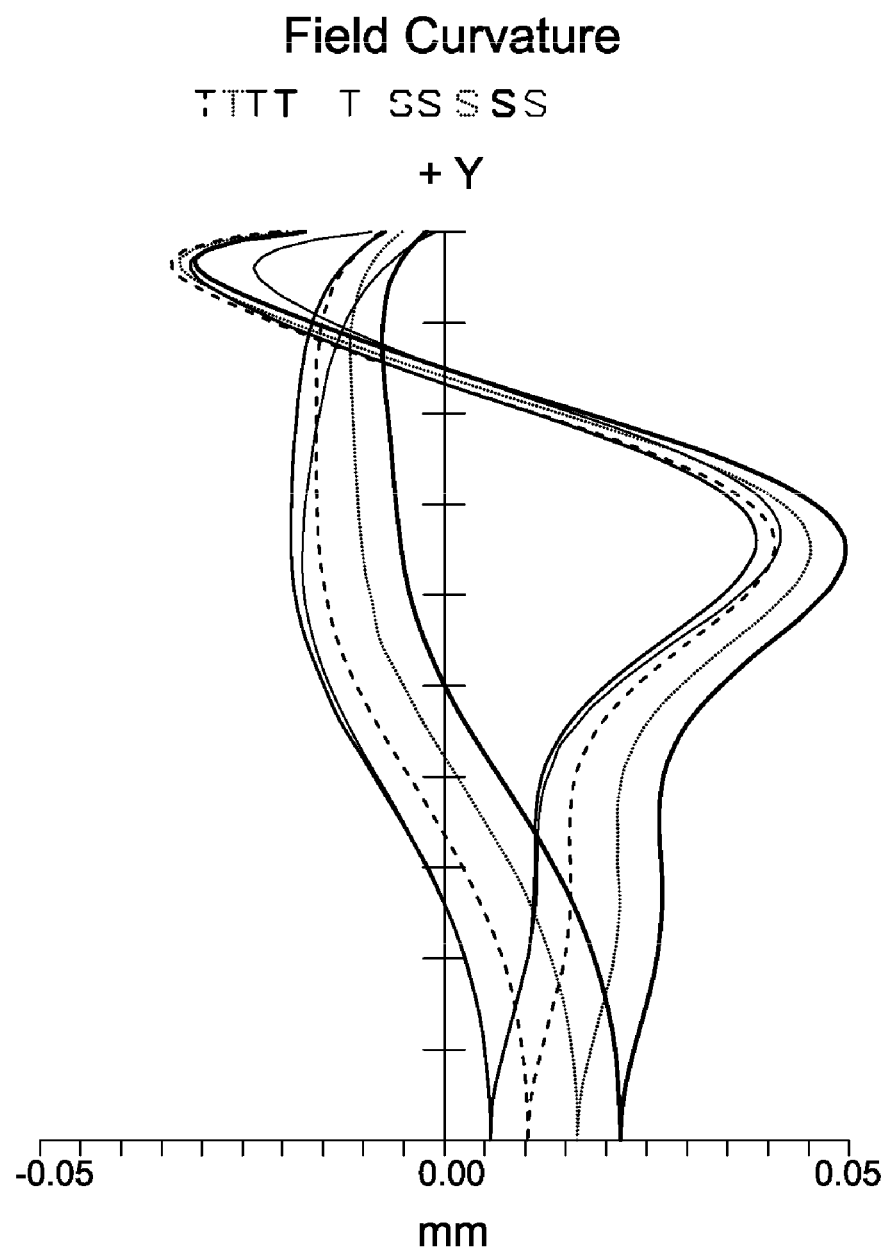
FIG. 4B is a field curvature diagram of the wide-angle lens assembly in accordance with the second embodiment of the invention.
Figure 4C:
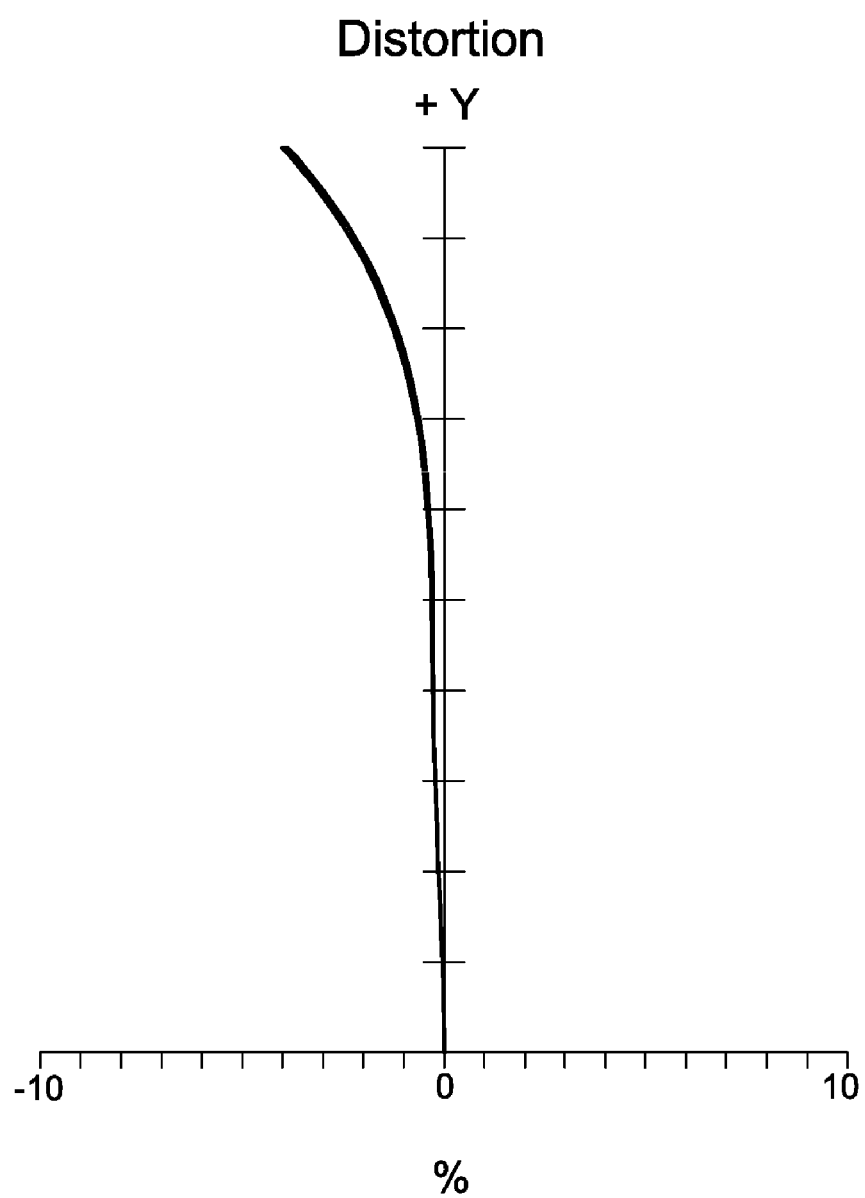
FIG. 4C is a distortion diagram of the wide-angle lens assembly in accordance with the second embodiment of the invention.

By the above arrangements of the lenses and stop ST2, the wide-angle lens assembly 2 of the second embodiment can meet the requirements of optical performance as seen in FIGS. 4A-4C, wherein FIG. 4A shows a longitudinal aberration diagram of the wide-angle lens assembly 2 in accordance with the second embodiment of the invention, FIG. 4B shows a field curvature diagram of the wide-angle lens assembly 2 in accordance with the second embodiment of the invention and FIG. 4C shows a distortion diagram of the wide-angle lens assembly 2 in accordance with the second embodiment of the invention.

It can be seen from FIG. 4A that the longitudinal aberration in the wide-angle lens assembly 2 of the second embodiment ranges from −0.025 mm to 0.025 mm for the wavelength of 0.455 μm, 0.502 μm, 0.558 μm, 0.614 μm and 0.661 μm. It can be seen from FIG. 4B that the field curvature of tangential direction and sagittal direction in the wide-angle lens assembly 2 of the second embodiment ranges from −0.035 mm to 0.05 mm for the wavelength of 0.455 μm, 0.502 μm, 0.558 μm, 0.614 μm and 0.661 μm. It can be seen from FIG. 4C (in which the five lines in the figure almost coincide to appear as if a signal line) that the distortion in the wide-angle lens assembly 2 of the second embodiment ranges from −4.0% to 0% for the wavelength of 0.455 μm, 0.502 μm, 0.558 μm, 0.614 μm and 0.661 μm. It is obvious that the longitudinal aberration, the field curvature and the distortion of the wide-angle lens assembly 2 of the second embodiment can be corrected effectively. Therefore, the wide-angle lens assembly 2 of the second embodiment is capable of good optical performance.

Figure 5:
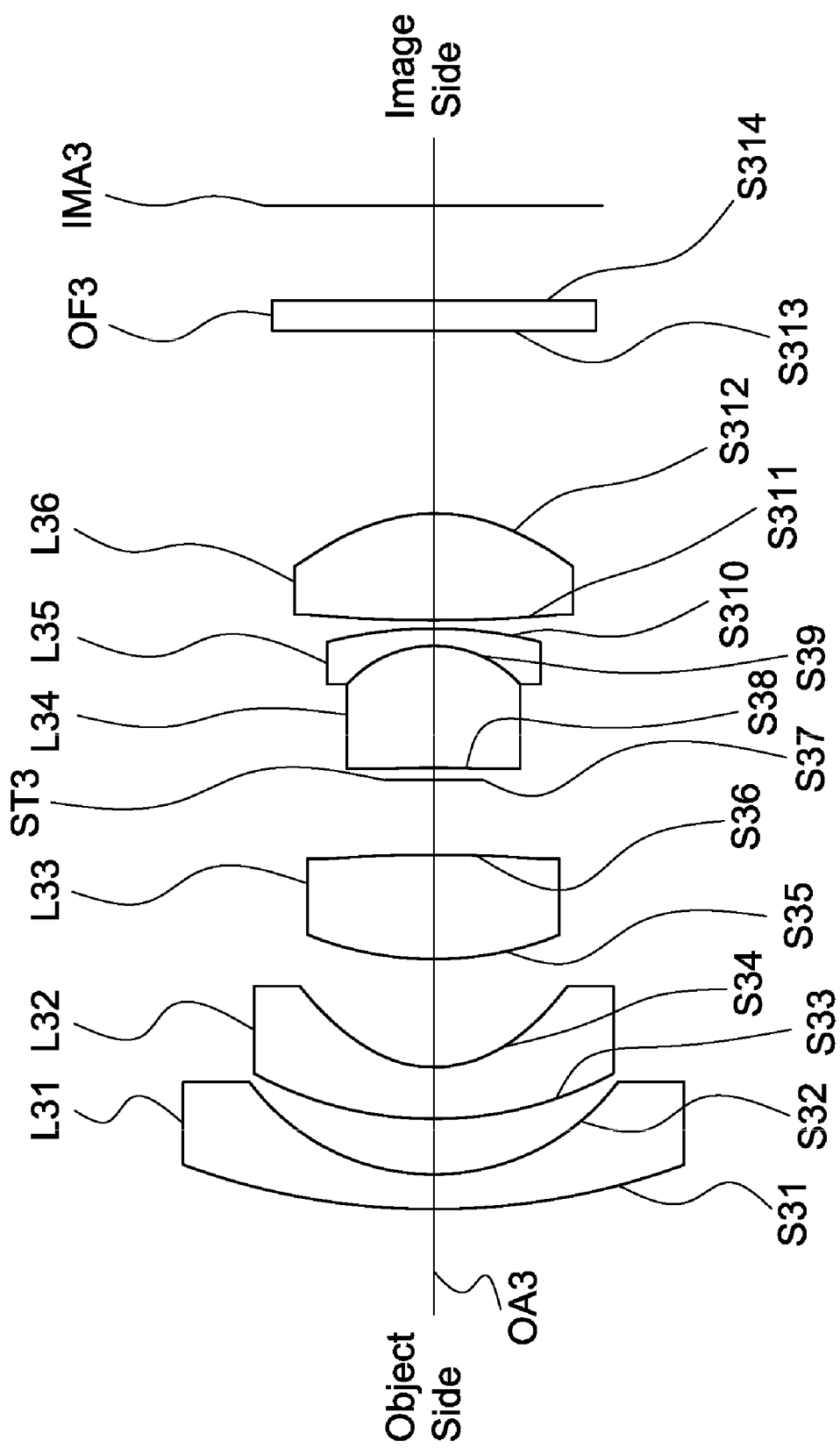
FIG. 5 is a lens layout diagram of a wide-angle lens assembly in accordance with a third embodiment of the invention.

Referring to FIG. 5, FIG. 5 is a lens layout diagram of a wide-angle lens assembly in accordance with a third embodiment of the invention. The wide-angle lens assembly 3 includes a first lens L31, a second lens L32, a third lens L33, a stop ST3, a fourth lens L34, a fifth lens L35, a sixth lens L36 and an optical filter OF3, all of which are arranged in order from an object side to an image side along an optical axis OA3. In operation, an image of light rays from the object side is formed at the image plane IMA3.

The first lens L31 is a meniscus lens with negative refractive power and made of glass material, wherein the object side surface S31 is a convex surface, the image side surface S32 is a concave surface and both of the object side surface S31 and image side surface S32 are spherical surfaces. The second lens L32 is a meniscus lens with negative refractive power and made of glass material, wherein the object side surface S33 is a convex surface, the image side surface S34 is a concave surface and both of the object side surface S33 and image side surface S34 are aspheric surfaces. The third lens L33 is a biconvex lens with positive refractive power and made of glass material, wherein the object side surface S35 is a convex surface, the image side surface S36 is a convex surface and both of the object side surface S35 and image side surface S36 are spherical surfaces. The fourth lens L34 is a meniscus lens with positive refractive power and made of glass material, wherein the object side surface S38 is a concave surface, the image side surface S39 is a convex surface and both of the object side surface S38 and image side surface S39 are spherical surfaces. The fifth lens L35 is a meniscus lens with negative refractive power and made of glass material, wherein the object side surface S39 is a concave surface, the image side surface S310 is a convex surface and both of the object side surface S39 and image side surface S310 are spherical surfaces. The fourth lens L34 and the fifth lens L35 are cemented together. The sixth lens L36 is a biconvex lens with positive refractive power and made of glass material, wherein the object side surface S311 is a convex surface, the image side surface S312 is a convex surface and both of the object side surface S311 and image side surface S312 are aspheric surfaces. Both of the object side surface S313 and image side surface S314 of the optical filter OF3 are plane surfaces.

In addition, the wide-angle lens assembly 3 of the third embodiment at least satisfies one of the following conditions:

$$Sag3_2/D3_2 \geq 0.24 \quad (13)$$

$$Sag3_4/D3_4 \geq 0.29 \quad (14)$$

$$0.2 \leq BFL3/TTL3 \leq 0.5 \quad (15)$$

$$Vd3_4 - Vd3_5 \geq 50 \quad (16)$$

$$Nd3_3 - Nd3_1 \geq 0.35 \quad (17)$$

$$20°/mm < DFOV3/f3 < 30°/mm \quad (18)$$

The definition of $Sag3_2$, $D3_2$, $Sag3_4$, $D3_4$, BFL3, TTL3, $Vd3_4$, $Vd3_5$, $Nd3_1$, $Nd3_3$, DFOV3 and f3 are the same as that of $Sag1_2$, $D1_2$, $Sag1_4$, $D1_4$, BFL1, TTL1, $Vd1_4$, $Vd1_5$, $Nd1_1$, $Nd1_3$, DFOV1 and f1 in the first embodiment, and is not described here again.

By the above design of the lenses and stop ST3, the wide-angle lens assembly 3 is provided with a shortened total lens length, a decreased F-number, an effective corrected aberration and a resistance to severe environment temperature change on image quality.

If the value of $Sag3_2/D3_2$ of condition (13) is less than 0.24, and it will bring poor effect of the elimination of spherical aberration. Therefore, the value of $Sag3_2/D3_2$ needs to at least greater than or equal to 0.24, an optimal range is $0.5 \geq Sag3_2/D3_2 \geq 0.24$ for the optimal benefit of elimination of spherical aberration.

surface, refractive index of each lens and Abbe number of each lens. Table 7 shows that the effective focal length is equal to 3.685 mm, F-number is equal to 2.8, total lens length is equal to 23.906 mm and diagonal field of view is equal to 97.46° for the wide-angle lens assembly 3 of the third embodiment of the invention.

TABLE 7

Effective Focal Length = 3.685 mm F-number = 2.8
Total Lens Length = 23.906 mm Diagonal Field of View = 97.46°

| Surface Number | Radius of Curvature (mm) | Thickness (mm) | Nd | Vd | Remark |
|---|---|---|---|---|---|
| S31 | 17.275 | 0.834 | 1.52 | 64.2 | The First Lens L31 |
| S32 | 5.499 | 1.327 | | | |
| S33 | 9.820 | 1.231 | 1.74 | 49.3 | The Second Lens L32 |
| S34 | 2.993 | 2.568 | | | |
| S35 | 8.017 | 2.501 | 1.9 | 31.3 | The Third Lens L33 |
| S36 | −29.229 | 1.767 | | | |
| S37 | ∞ | 0.292 | | | Stop ST2 |
| S38 | −35.602 | 2.908 | 1.5 | 81.6 | The Fourth Lens L34 |
| S39 | −2.796 | 0.413 | 1.81 | 25.5 | The Fifth Lens L35 |
| S310 | −10.482 | 0.198 | | | |
| S311 | 31.342 | 2.544 | 1.68 | 54.9 | The Sixth Lens L36 |
| S312 | −4.153 | 4.351 | | | |
| S313 | ∞ | 0.720 | 1.52 | 64.2 | Optical Filter OF3 |
| S314 | ∞ | 2.253 | | | |

The aspheric surface sag z of each lens in Table 7 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the third embodiment, the conic constant k and the aspheric coefficients A, B, C, D, E, F, G of each surface are shown in Table 8.

TABLE 8

| Surface Number | k | A | B | C | D | E | F | G |
|---|---|---|---|---|---|---|---|---|
| S33 | −1.019 | 2.47E−03 | −2.72E−04 | 2.01E−05 | −1.23E−06 | 5.08E−08 | −1.11E−09 | 8.62E−12 |
| S34 | −0.564 | 3.42E−03 | −7.24E−04 | 1.13E−04 | −2.16E−05 | 2.40E−06 | −1.37E−07 | 3.11E−09 |
| S311 | −23.706 | −1.02E−03 | 7.91E−05 | 3.17E−05 | −1.02E−05 | 1.43E−06 | −9.22E−08 | 2.24E−09 |
| S312 | −0.683 | 5.33E−04 | 9.89E−05 | −3.49E−05 | 8.71E−06 | −1.11E−06 | 7.22E−08 | −1.82E−09 |

If the value of $Sag3_4/D3_4$ of condition (14) is less than 0.29, and it will bring poor effect of the elimination of coma aberration. Therefore, the value of $Sag3_4/D3_4$ needs to at least greater than or equal to 0.29, but if the value of $Sag3_4/D3_4$ greater than 1 then it will become difficult on production of lens, hence, an optimal range is $1 \geq Sag3_4/D3_4 \geq 0.29$ for the optimal benefit of elimination of coma aberration.

In order to achieve the above purposes and effectively enhance the optical performance, the wide-angle lens assembly 3 in accordance with the third embodiment of the invention is provided with the optical specifications shown in Table 7, which include the effective focal length, F-number, total lens length, diagonal field of view, radius of curvature of each lens surface, thickness between adjacent Table 9 shows the parameter value and the calculated value of the above conditions (13)-(18). For the wide-angle lens assembly 3 of the third embodiment which respectively satisfy the above conditions (13)-(18) as can be seen from table 9.

TABLE 9

| | | | | | |
|---|---|---|---|---|---|
| $Sag3_2$ | 2.197 mm | $D3_2$ | 8.808 mm | $Sag3_4$ | 1.916 mm |
| $D3_4$ | 6.402 mm | BFL3 | 7.324 mm | TTL3 | 23.906 mm |
| $Vd3_4$ | 81.6 | $Vd3_5$ | 25.5 | $Nd3_1$ | 1.52 |
| $Nd3_3$ | 1.9 | DFOV3 | 97.46° | f3 | 3.685 mm |
| $Sag3_2/D3_2$ | 0.249 | $Sag3_4/D3_4$ | 0.299 | BFL3/TTL3 | 0.306 |

TABLE 9-continued

| | | | | | |
|---|---|---|---|---|---|
| $Vd3_4 - Vd3_5$ | 56.1 | $Nd3_3 - Nd3_1$ | 0.38 | $DFOV3/f3$ | 26.448°/mm |

Figure 6A:
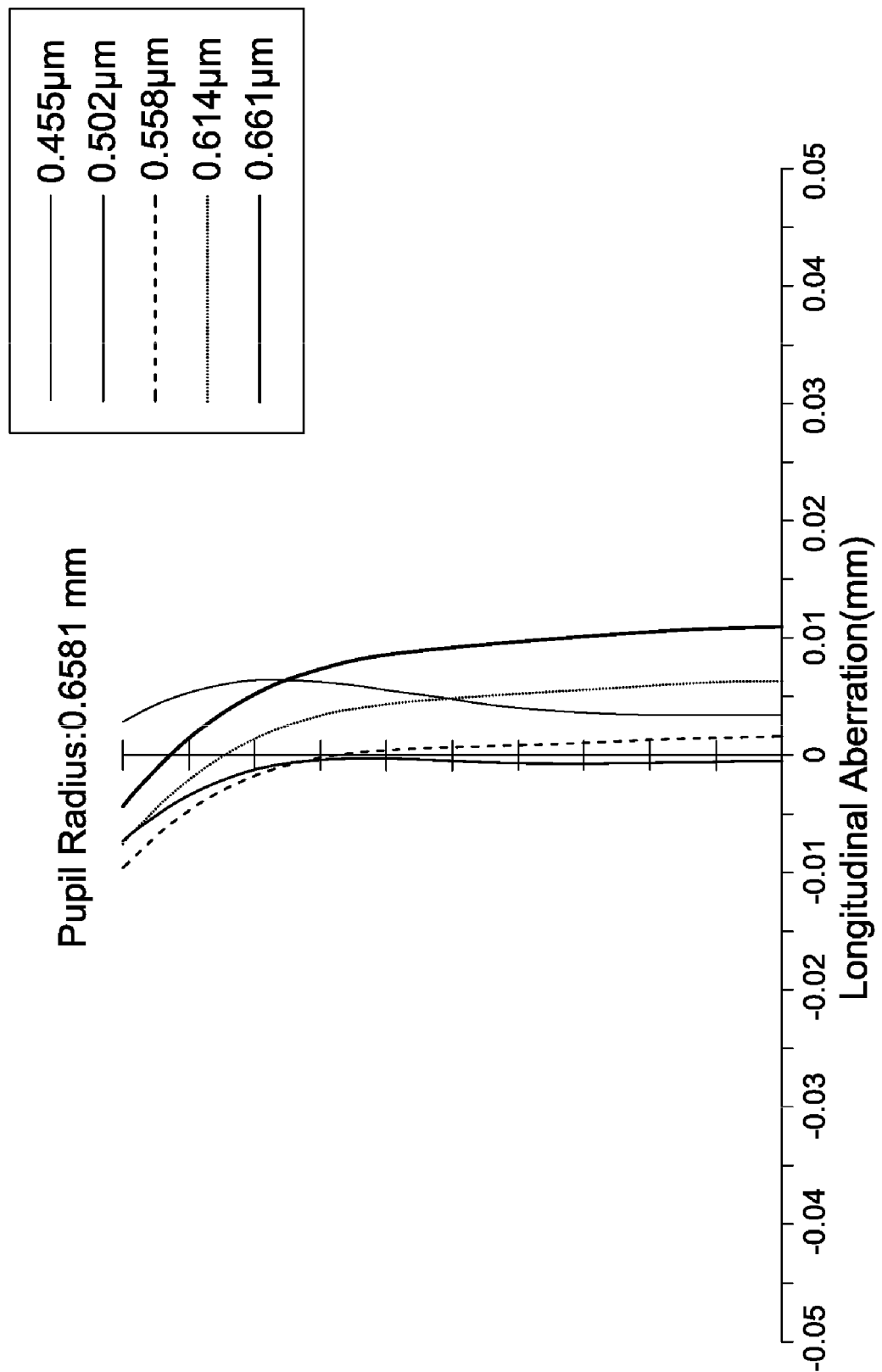
FIG. 6A depicts a longitudinal aberration diagram of the wide-angle lens assembly in accordance with the third embodiment of the invention.
Figure 6B:
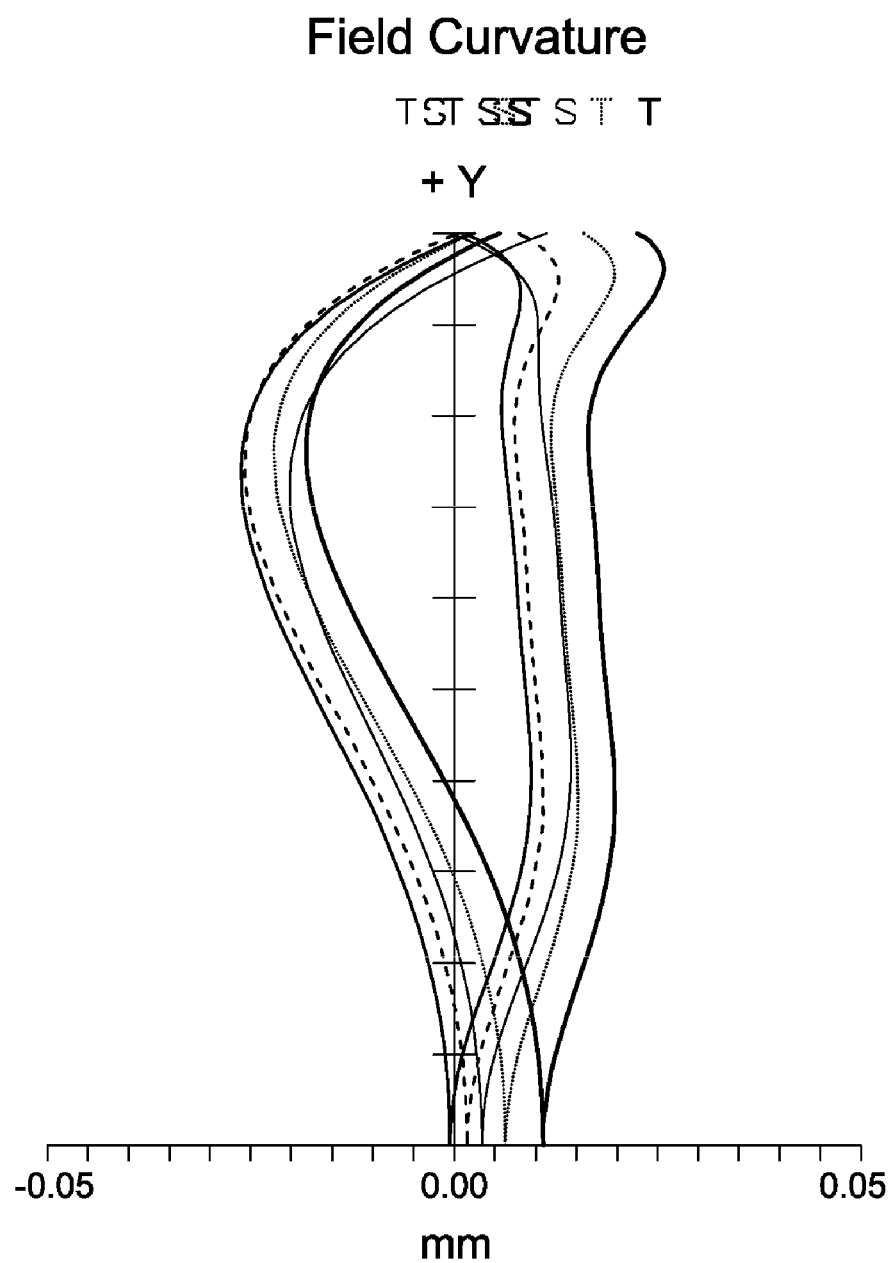
FIG. 6B is a field curvature diagram of the wide-angle lens assembly in accordance with the third embodiment of the invention.
Figure 6C:
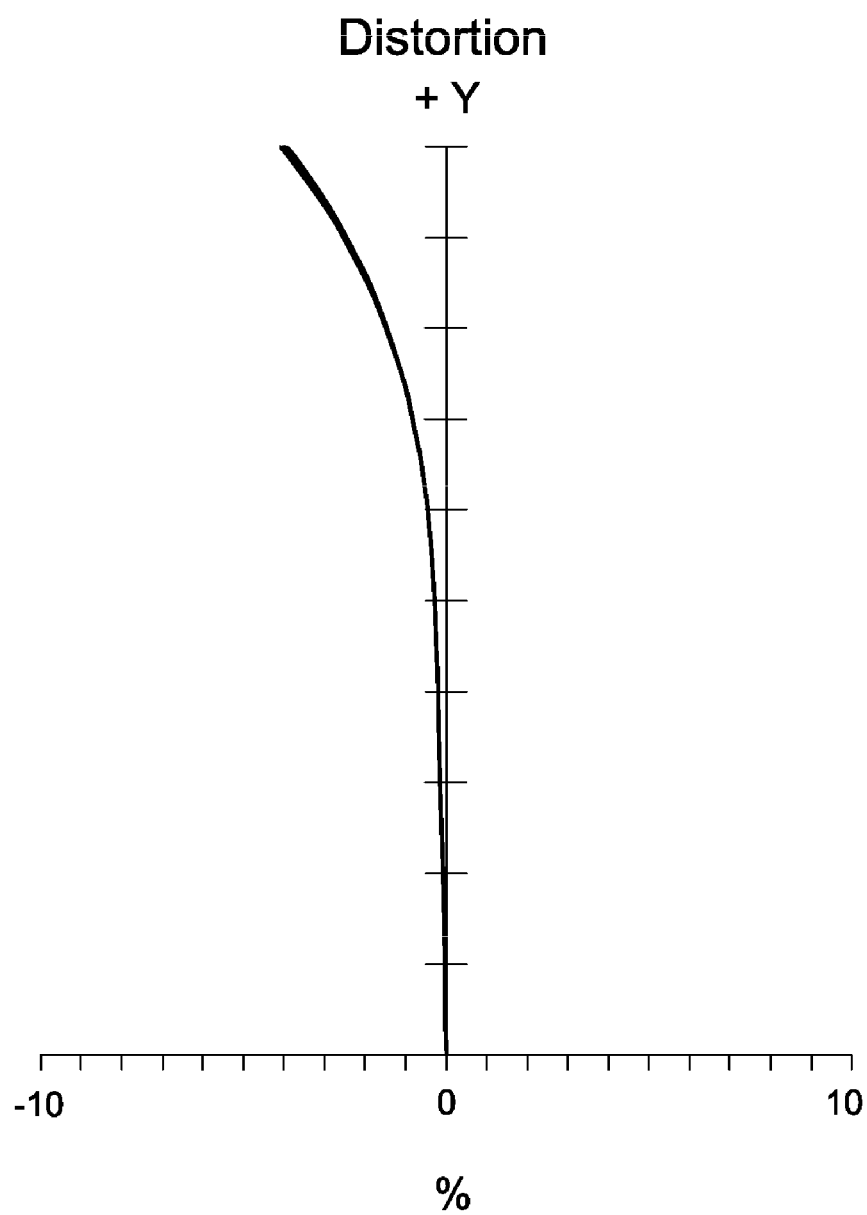
FIG. 6C is a distortion diagram of the wide-angle lens assembly in accordance with the third embodiment of the invention.

By the above arrangements of the lenses and stop ST3, the wide-angle lens assembly 3 of the third embodiment can meet the requirements of optical performance as seen in FIGS. 6A-6C, wherein FIG. 6A shows a longitudinal aberration diagram of the wide-angle lens assembly 3 in accordance with the third embodiment of the invention, FIG. 6B shows a field curvature diagram of the wide-angle lens assembly 3 in accordance with the third embodiment of the invention and FIG. 6C shows a distortion diagram of the wide-angle lens assembly 3 in accordance with the third embodiment of the invention.

It can be seen from FIG. 6A that the longitudinal aberration in the wide-angle lens assembly 3 of the third embodiment ranges from −0.01 mm to 0.015 mm for the wavelength of 0.455 μm, 0.502 μm, 0.558 μm, 0.614 μm and 0.661 μm. It can be seen from FIG. 6B that the field curvature of tangential direction and sagittal direction in the wide-angle lens assembly 3 of the third embodiment ranges from −0.03 mm to 0.03 mm for the wavelength of 0.455 μm, 0.502 μm, 0.558 μm, 0.614 μm and 0.661 μm. It can be seen from FIG. 6C (in which the five lines in the figure almost coincide to appear as if a signal line) that the distortion in the wide-angle lens assembly 3 of the third embodiment ranges from −4% to 0% for the wavelength of 0.455 μm, 0.502 μm, 0.558 μm, 0.614 μm and 0.661 μm. It is obvious that the longitudinal aberration, the field curvature and the distortion of the wide-angle lens assembly 3 of the third embodiment can be corrected effectively. Therefore, the wide-angle lens assembly 3 of the third embodiment is capable of good optical performance.

These conditions $Sag_2/D_2 \geq 0.24$, $Sag_4/D_4 \geq 0.29$, $Vd_4 - Vd_5 \geq 50$, $Nd_3 - Nd_1 \geq 0.35$ which been satisfied are the center of the invention, the values of the embodiments of the present invention also within the scope of the remaining conditions. The condition $Sag_2/D_2 \geq 0.24$ for the benefit of elimination of spherical aberration, an optimal range is $0.5 \geq Sag_2/D_2 \geq 0.24$. The condition $Sag_4/D_4 \geq 0.29$ for the benefit of elimination of coma aberration, an optimal range is $1 \geq Sag_4/D_4 \geq 0.29$. The condition $Vd_4 - Vd_5 \geq 50$ for the benefit of elimination of chromatic aberration, an optimal range is $79 \geq Vd_4 - Vd_5 \geq 50$. The condition $Nd_3 - Nd_1 \geq 0.35$ for the benefit of shortened total lens length, an optimal range is $0.59 \geq Nd_3 - Nd_1 \geq 0.35$.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A wide-angle lens assembly, comprising sequentially from an object side to an image side along an optical axis:
   a first lens which is a meniscus lens with negative refractive power;
   a second lens with negative refractive power including a convex surface facing the object side;
   a third lens with positive refractive power including a convex surface facing the object side;
   a fourth lens with positive refractive power including a convex surface facing the image side;
   a fifth lens with negative refractive power including a convex surface facing the image side;
   a sixth lens with positive refractive power;
   wherein the wide-angle lens assembly satisfies:

$Vd_4 - Vd_5 \geq 50$ wherein $Vd_4$ is an Abbe number of the fourth lens and $Vd_5$ is an Abbe number of the fifth lens;
   wherein the fourth lens and the fifth lens are cemented together, the second lens and the sixth lens further comprises at least one aspheric surface.

2. The wide-angle lens assembly as claimed in claim 1, wherein the first lens further comprises a convex surface facing the object side and a concave surface facing the image side, the second lens further comprises a concave surface facing the image side, the fifth lens further comprises a concave surface facing the object side and the sixth lens further comprises a convex surface facing the object side and a convex surface facing the image side.

3. A wide-angle lens assembly, comprising sequentially from an object side to an image side along an optical axis:
   a first lens which is a meniscus lens with negative refractive power;
   a second lens with negative refractive power including a convex surface facing the object side;
   a third lens with positive refractive power including a convex surface facing the object side;
   a fourth lens with positive refractive power including a convex surface facing the image side;
   a fifth lens with negative refractive power including a convex surface facing the image side;
   a sixth lens with positive refractive power;
   wherein the wide-angle lens assembly satisfies:

$Nd_3 - Nd_1 \geq 0.35$ wherein $Nd_1$ is a refractive index of the first lens and $Nd_3$ is a refractive index of the third lens.

4. The wide-angle lens assembly as claimed in claim 3, wherein the wide-angle lens assembly satisfies:

$79 \geq Vd_4 - Vd_5 \geq 50$, $0.59 \geq Nd_3 - Nd_1 \geq 0.35$ wherein $Vd_4$ is an Abbe number of the fourth lens, $Vd_5$ is an Abbe number of the fifth lens, $Nd_1$ is a refractive index of the first lens and $Nd_3$ is a refractive index of the third lens.

5. The wide-angle lens assembly as claimed in claim 1, wherein the wide-angle lens assembly satisfies:

$Sag_2/D_2 \geq 0.24$, $Sag_4/D_4 \geq 0.29$ wherein $Sag_2$ is a distance vertically measuring from a plane formed by the edge of image side surface of the first lens to the vertex of the image side surface of the first lens, $D_2$ is an effective diameter of the image side surface of the first lens, $Sag_4$ is a distance vertically measuring from a plane formed by the edge of image side surface of the second lens to the vertex of the image side surface of the second lens and $D_4$ is an effective diameter of the image side surface of the second lens.

6. The wide-angle lens assembly as claimed in claim 5, wherein the wide-angle lens assembly satisfies:

$0.5 \geq Sag_2/D_2 \geq 0.24$, $1 \geq Sag_4/D_4 \geq 0.29$ wherein $Sag_2$ is a distance vertically measuring from a plane formed by the edge of image side surface of the first lens to the vertex of the image side surface of the first lens, $D_2$ is an effective diameter of the image side surface of the first lens, $Sag_4$ is a distance vertically measuring from a plane formed by the edge of image side surface of the second lens to the vertex of the image side surface of the second lens and $D_4$ is an effective diameter of the image side surface of the second lens.

7. The wide-angle lens assembly as claimed in claim 1, wherein the wide-angle lens assembly satisfies:

$$0.2 \leq BFL/TTL \leq 0.5$$

wherein BFL is an interval from the image side surface of the sixth lens to an image plane along the optical axis and TTL is an interval from an object side surface of the first lens to the image plane along the optical axis.

8. The wide-angle lens assembly as claimed in claim 1, wherein the wide-angle lens assembly satisfies:

$$20°/mm < DFOV/f < 30°/mm$$

wherein DFOV is a diagonal field of view in degree for the wide-angle lens assembly and f is an effective focal length in mm of the wide-angle lens assembly.

9. The wide-angle lens assembly as claimed in claim 3, wherein the fourth lens and the fifth lens are cemented together, the second lens and the sixth lens further comprises at least one aspheric surface.

10. A wide-angle lens assembly, comprising sequentially from an object side to an image side along an optical axis:
  a first lens which is a meniscus lens with negative refractive power;
  a second lens with negative refractive power including a convex surface facing the object side;
  a third lens with positive refractive power including a convex surface facing the object side;
  a fourth lens with positive refractive power including a convex surface facing the image side;
  a fifth lens with negative refractive power including a convex surface facing the image side;
  a sixth lens with positive refractive power;
  wherein the optical lens assembly satisfies:

$$Sag_4/D_4 \geq 0.29$$

wherein $Sag_4$ is a distance vertically measuring from a plane formed by the edge of image side surface of the second lens to the vertex of the image side surface of the second lens and $D_4$ is an effective diameter of the image side surface of the second lens.

11. The wide-angle lens assembly as claimed in claim 10, wherein the wide-angle lens assembly satisfies:

$$0.5 \geq Sag_2/D_2 \geq 0.24,$$

$$1 \geq Sag_4/D_4 \geq 0.29$$

wherein $Sag_2$ is a distance vertically measuring from a plane formed by the edge of image side surface of the first lens to the vertex of the image side surface of the first lens, $D_2$ is an effective diameter of the image side surface of the first lens, $Sag_4$ is a distance vertically measuring from a plane formed by the edge of image side surface of the second lens to the vertex of the image side surface of the second lens and $D_4$ is an effective diameter of the image side surface of the second lens.

12. The wide-angle lens assembly as claimed in claim 10, wherein the wide-angle lens assembly satisfies:

$$79 \geq Vd_4 - Vd_5 \geq 50,$$

$$0.59 \geq Nd_3 - Nd_1 \geq 0.35$$

wherein $Vd_4$ is an Abbe number of the fourth lens, $Vd_5$ is an Abbe number of the fifth lens, $Nd_1$ is a refractive index of the first lens and $Nd_3$ is a refractive index of the third lens.

13. The wide-angle lens assembly as claimed in claim 10, wherein the wide-angle lens assembly satisfies:

$$0.2 \leq BFL/TTL \leq 0.5$$

wherein BFL is an interval from the image side surface of the sixth lens to an image plane along the optical axis and TTL is an interval from an object side surface of the first lens to the image plane along the optical axis.

14. The wide-angle lens assembly as claimed in claim 10, wherein the wide-angle lens assembly satisfies:

$$20°/mm < DFOV/f < 30°/mm$$

wherein DFOV is a diagonal field of view in degree for the wide-angle lens assembly and f is an effective focal length in mm of the wide-angle lens assembly.

15. The wide-angle lens assembly as claimed in claim 10, wherein the fourth lens and the fifth lens are cemented together, the second lens and the sixth lens further comprises at least one aspheric surface.

16. A wide-angle lens assembly, comprising sequentially from an object side to an image side along an optical axis:
  a first lens which is a meniscus lens with negative refractive power;
  a second lens with negative refractive power including a convex surface facing the object side;
  a third lens with positive refractive power including a convex surface facing the object side;
  a fourth lens with positive refractive power including a convex surface facing the image side;
  a fifth lens with negative refractive power including a convex surface facing the image side;
  a sixth lens with positive refractive power;
  wherein the optical lens assembly satisfies:

$$0.279 \leq BFL/TTL \leq 0.5$$

wherein BFL is an interval from the image side surface of the sixth lens to an image plane along the optical axis and TTL is an interval from an object side surface of the first lens to the image plane along the optical axis.

17. The wide-angle lens assembly as claimed in claim 16, wherein the wide-angle lens assembly satisfies:

$$Sag_2/D_2 \geq 0.24,$$

$$Sag_4/D_4 \geq 0.29$$

wherein $Sag_2$ is a distance vertically measuring from a plane formed by the edge of image side surface of the first lens to the vertex of the image side surface of the first lens, $D_2$ is an effective diameter of the image side surface of the first lens, $Sag_4$ is a distance vertically measuring from a plane formed by the edge of image side surface of the second lens to the vertex of the image side surface of the second lens and $D_4$ is an effective diameter of the image side surface of the second lens.

18. The wide-angle lens assembly as claimed in claim 16, wherein the wide-angle lens assembly satisfies:

$$Vd_4 - Vd_5 \geq 50,$$

$$Nd_3 - Nd_1 \geq 0.35$$

wherein $Vd_4$ is an Abbe number of the fourth lens, $Vd_5$ is an Abbe number of the fifth lens, $Nd_1$ is a refractive index of the first lens and $Nd_3$ is a refractive index of the third lens.

19. The wide-angle lens assembly as claimed in claim 16, wherein the wide-angle lens assembly satisfies:

$$20°/mm < DFOV/f < 30°/mm$$

wherein DFOV is a diagonal field of view in degree for the wide-angle lens assembly and f is an effective focal length in mm of the wide-angle lens assembly.

20. The wide-angle lens assembly as claimed in claim 16, wherein the fourth lens and the fifth lens are cemented together, the second lens and the sixth lens further comprises at least one aspheric surface.

* * * * *